No. 835,102. PATENTED NOV. 6, 1906.
S. DODGE.
HUB FOR CULTIVATOR DISKS.
APPLICATION FILED DEC. 19, 1905.
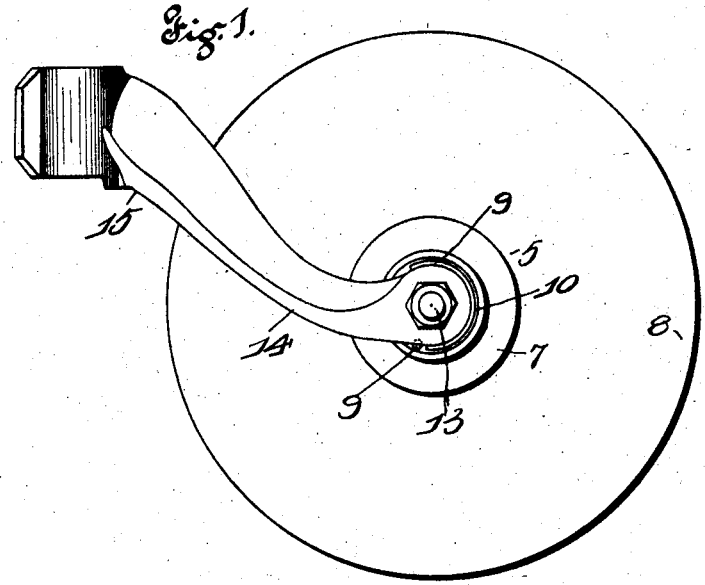
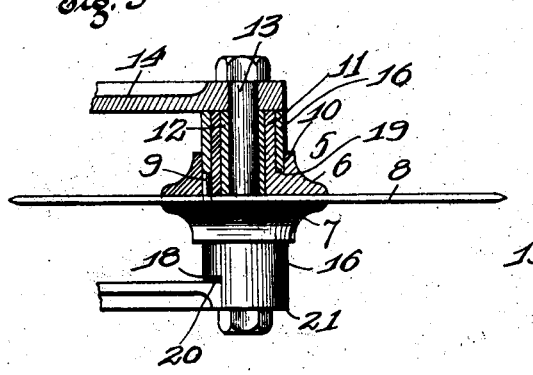

UNITED STATES PATENT OFFICE.

SHERMAN DODGE, OF SANDOVAL, ILLINOIS.

HUB FOR CULTIVATOR-DISKS.

No. 835,102.  Specification of Letters Patent.  Patented Nov. 6, 1906.

Application filed December 19, 1905. Serial No. 292,492.

*To all whom it may concern:*

Be it known that I, SHERMAN DODGE, a citizen of the United States, and a resident of Sandoval, Marion county, Illinois, have invented certain new and useful Improvements in Hubs for Cultivating-Disks, of which the following is a specification.

This invention relates to improvements in hubs for cultivating-disks; and it consists in the novel arrangement, construction, and combination of parts, as will be fully hereinafter described and claimed.

The object of my invention is to construct a hub for colter-disks with an inner sleeve so arranged as to freely move therein independently of the colter-disk.

In the drawings, Figure 1 is a side elevation of a colter-disk, showing the yoke to which the same is attached. Fig. 2 is an end view of the same. Fig. 3 is a top plan view, with a part broken away, showing a portion of the hub in section. Fig. 4 is a detail perspective view of the guard made use of in connection with my invention.

In the construction of the device as shown I provide a hub 5, composed of two sections 6 and 7. Between the sections 6 and 7 is located the colter-disk 8, which is held in position by means of pins 9, passing through both of the sections and the disk to rigidly secure the three parts together. The sections 6 and 7 are each provided with a recess 10 and a projecting cylindrical portion 11.

The central portion of the hub is suitably bored out to admit the insertion of a sleeve 12, through which is passed the bolt or shaft 13, by which the hub and colter-disk are supported between the arms 14 of the yoke 15.

During the revolution of the colter-disk while in practical operation with a plow grass is often caught between the hub and the arms 14 of the yoke and becomes so tightly wound around the same that it is necessary to cease the operation to remove the same. To dispense with this, I provide a guard 16, which consists of a tube 17, having a portion thereof cut away, as indicated by the numeral 18. The guard 16 is passed over the cylindrical projection 11, permitting the end 19 to be inserted into the recess 10, formed in the hub, the end 20 contacting with the arms 14 of the yoke, while the end 21 projects over the bearing portion of the arms 14, and thus prevents the guard from revolving and also prevent any grass from coming between or passing in between the hub and the bearing portion of the arms 14.

The purpose of placing the sleeve 12 within the hub is to dispense with the wearing of the hub upon the bolt, and thereby necessitate the replacement of the hub after the same has become sufficiently worn. In a device of this construction the operator has but to replace the hub with a new sleeve should the same become worn.

Having fully described my invention, what I claim, and desire to secure by Letters Patent, is—

1. A hub for colter-disks composed of two sections, a circular recess formed in each of said sections, a yoke, a cylindrical projection formed on each of said sections and extending to the arms of the yoke, an inner sleeve extending the length of both sections, and a colter-disk to which each of said sections is attached, substantially as specified.

2. A hub for colter-disks comprising two sections, a colter-disk, a yoke, each of said sections rigidly attached to said colter-disk, a recess formed in each of said sections, an integral cylindrical projection formed on each of said sections their free ends contacting with the yoke-arms, a sleeve located within said sections and extending throughout their length, a bolt passed through said sleeve for supporting the hub to the colter-yoke, tubular guards located on each of said sections, the one end thereof projecting into the recess formed in said sections the other end extending over the arms of the yoke to prevent the lodgment of grass between the hub and colter-yoke, substantially as specified.

3. A hub for colter-disks comprising two sections rigidly secured to a colter-disk, each section being provided with a recess, pins for supporting the sections to the colter-disk inserted through the recesses, a guard located around each section, and projecting into the recess, and projecting over the two bearings one for each section by which the hub is supported to prevent lodgment of grass between the hub ends and bearings, substantially as specified.

In testimony whereof I have signed my name to this specification in presence of two subscribing witnesses.

SHERMAN DODGE.

Witnesses:
 W. K. BLOOM,
 GEO. PTOMEY.